US012780294B2

(12) United States Patent
Noerenberg

(10) Patent No.: US 12,780,294 B2
(45) Date of Patent: Nov. 3, 2026

(54) ELECTRIC POWER STEERING GEAR ASSEMBLY WITH A BALL SCREW SUPPORT SHAFT

(71) Applicant: ZF CV Systems Global GmbH, Bern (CH)

(72) Inventor: Ryan Noerenberg, West Lafayette, IN (US)

(73) Assignee: ZF CV SYSTEMS GLOBAL GMBH, Bern (CH)

( * ) Notice: Subject to any disclaimer, the term of this patent is extended or adjusted under 35 U.S.C. 154(b) by 274 days.

(21) Appl. No.: 18/657,916

(22) Filed: May 8, 2024

(65) Prior Publication Data

US 2025/0346290 A1 Nov. 13, 2025

(51) Int. Cl.
*B62D 5/04* (2006.01)

(52) U.S. Cl.
CPC .................................. *B62D 5/0448* (2013.01)

(58) Field of Classification Search
CPC ............................ B62D 5/0445; B62D 5/0454
See application file for complete search history.

(56) References Cited

U.S. PATENT DOCUMENTS 8,360,197 B2 * 1/2013 Escobedo ............ B62D 5/0454 180/407
2024/0294207 A1 * 9/2024 Saito .................... B62D 5/0454

* cited by examiner

*Primary Examiner* — Kevin Hurley
(74) *Attorney, Agent, or Firm* — LEYDIG, VOIT & MAYER, LTD.

(57) ABSTRACT

An electric powered steering assembly for a commercial vehicle includes a housing, a hollow ball screw, a ball nut, and an inner shaft. The housing includes a substantially cylindrical portion extending in an axial direction. The hollow ball screw is disposed in the housing, and defines a cavity extending in the axial direction. The ball nut is disposed in the housing circumferentially surrounding the hollow ball screw and configured to translate axially relative to the housing. The inner shaft is disposed in the cavity of the hollow ball screw and rigidly attached to the hollow ball screw at a first end. The inner shaft is configured to enable deflection of the hollow ball screw relative to the axial direction in response to external loads exerted by the ball nut.

10 Claims, 1 Drawing Sheet

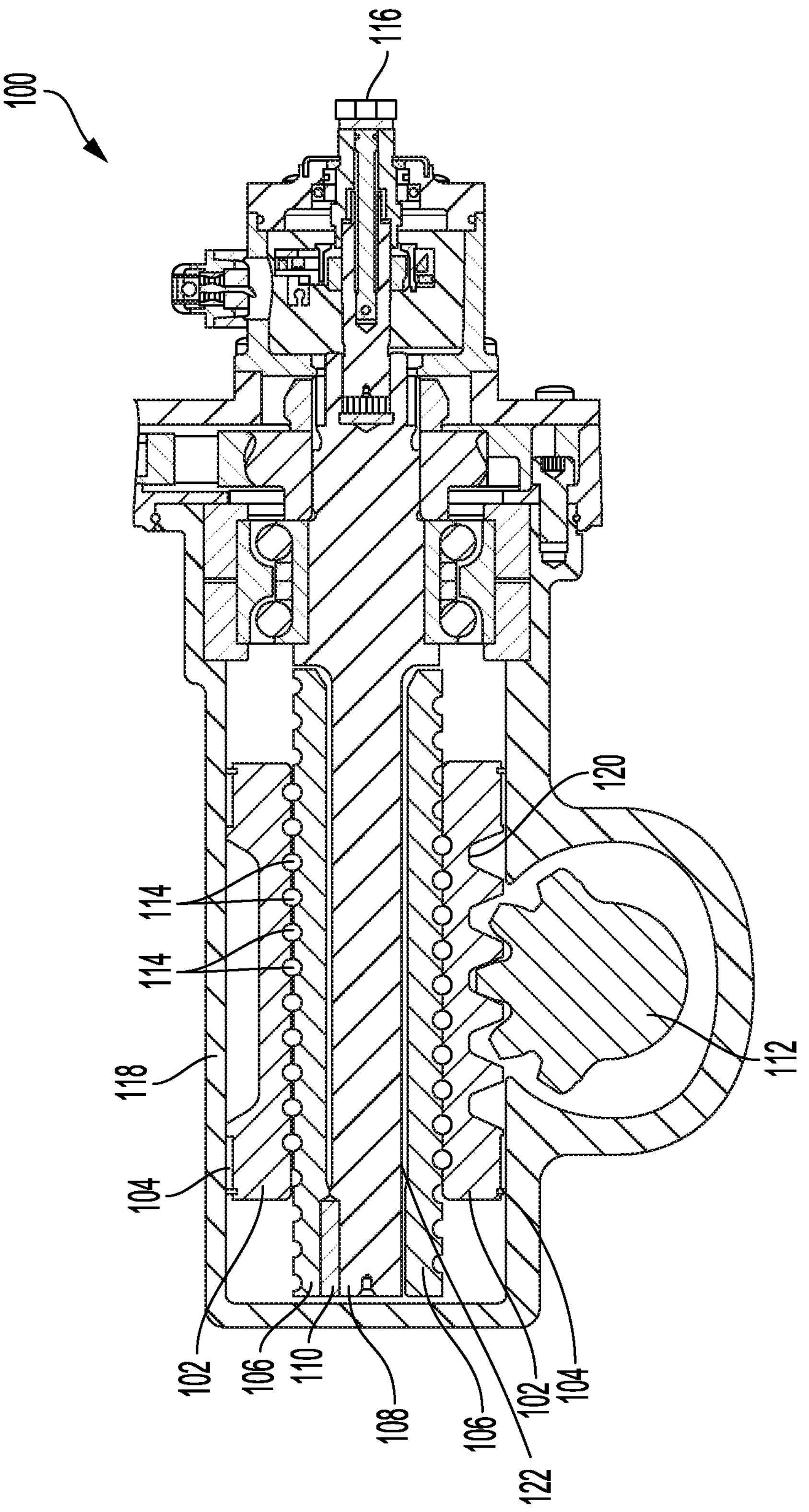
100
116
120
114
114
118
112
104
102
106
110
108
106
102
104
122

ELECTRIC POWER STEERING GEAR ASSEMBLY WITH A BALL SCREW SUPPORT SHAFT

FIELD

The present disclosure relates to a steering gear assembly for a vehicle with a ball screw support shaft.

BACKGROUND

Commercial vehicles use Electric Powered Steering (EPS). Electric Powered Steering is implemented using an electric power steering gear assembly. The electric power steering gear assembly utilizes a rotating ball screw and a ball nut that translates linearly relative to the ball screw. This linear translation motion of the ball nut is transmitted via a rack to rotate a sector shaft and ultimately to turn the wheels of a vehicle. During normal operation, the wheels of the vehicle, which are connected to the rack and sector shaft, are subjected to exert radial and tangential forces and vibrations that are transmitted back to the sector shaft and the rack of the electric power steering gear assembly. These forces and vibrations exerted on the sector shaft are transmitted to the rack, ball nut and the ball screw. In conventional electric power gear assemblies, these forces cause the ball nut to tilt relative to the ball screw, thus interfering with optimal interaction of the ball nut and ball screw. This leads to suboptimal transmission of steering forces and ultimately leads to premature failures of the electric power steering gear assembly.

SUMMARY

Embodiments of the present disclosure provide, in a first aspect, an electric powered steering assembly for a commercial vehicle is provided. The electric powered steering assembly comprises: a housing including a substantially cylindrical portion extending in an axial direction; a hollow ball screw disposed in the housing, and defining a cavity extending in the axial direction; a ball nut disposed in the housing circumferentially surrounding the hollow ball screw and configured to translate axially relative to the housing; and an inner shaft disposed in the cavity of the hollow ball screw and rigidly attached to the hollow ball screw at a first end, the inner shaft is configured to enable deflection of the hollow ball screw relative to the axial direction in response to external loads exerted by the ball nut.

The electric powered steering assembly of claim 1, wherein the inner shaft is composed of carbon steel that is quench and tempered to achieve a hardness of ~28-34 Rockwell hardness C (HRC).

According to an implementation of the first aspect, the inner shaft is composed of carbon steel that is carburized to achieve surface hardness.

According to an implementation of the first aspect, the support bushing is made of steel.

According to an implementation of the first aspect, a low friction coating is applied to an outside surface of the support bushing.

According to an implementation of the first aspect, the inner shaft is coupled to the hollow ball screw using a screw thread.

According to an implementation of the first aspect, the inner shaft is coupled to the hollow ball screw using a dowel pin to ensure that the screw threads do not unthread under torque.

According to an implementation of the first aspect, the electric powered steering assembly further comprises: a first plurality of channels between the ball nut and the hollow ball screw; and a second plurality of recirculating balls disposed in the channels, wherein a circulation of the second plurality of recirculating balls in the first plurality of channels transmit forces from a rotation of the hollow ball screw to cause the axial translation of the ball nut.

According to an implementation of the first aspect, the electric power steering assembly further comprises a support bushing disposed on an outer circumference of the ball nut and configured to contact an interior surface of the housing when the hollow ball screw is deflected.

According to an implementation of the first aspect, the electric power steering assembly further comprises: a rack comprising a set of teeth is rigidly attached to an outer circumference of the ball nut and configured to translate with the ball nut as the ball nut axially translates with respect to the housing; and a sector shaft comprising a set of gear teeth that engage with the set of teeth of the rack and configured to rotate based on the translation of the rack.

BRIEF DESCRIPTION OF THE DRAWINGS

Embodiments of the present disclosure will be described in even greater detail below based on the exemplary figures. The present disclosure is not limited to the exemplary embodiments. All features described and/or illustrated herein can be used alone or combined in different combinations in embodiments of the present disclosure. The features and advantages of various embodiments of the present disclosure will become apparent by reading the following detailed description with reference to the attached drawings which illustrate the following:

FIG. 1 illustrates a portion of a gear assembly of a vehicle, according to one or more examples of the present disclosure.

DETAILED DESCRIPTION

Examples of the presented application will now be described more fully hereinafter with reference to the accompanying FIG., in which some, but not all, examples of the application are shown. Indeed, the application may be exemplified in different forms and should not be construed as limited to the examples set forth herein; rather, these examples are provided so that the application will satisfy applicable legal requirements. Furthermore, when it is said herein that something is “based on” something else, it may be based on one or more other things as well. In other words, unless expressly indicated otherwise, as used herein “based on” means “based at least in part on” or “based at least partially on”.

Commercial vehicles use Electric Powered Steering (EPS) for steering. Electric Powered Steering is implemented using an electric power steering gear assembly. Electric power steering gear assemblies include a ball screw oriented substantially horizontally and transversely to the origin direction of the vehicle. The ball screw is disposed within a gear housing and is circumferentially surrounded by a ball nut also disposed in the housing in a manner that prevents rotational movement of the ball nut relative to the housing. Upon receiving steering commands from a driver, the electric power steering gear assembly of the vehicle comprising the ball nut and ball screw is configured transfer the steering command from the driver to the wheels of the vehicle. For example, upon receiving the steering command from a driver, the ball screw rotates and the ball nut is configured to translate axially over the ball screw. Due to the threading of the ball screw and ball nut, rotation of the ball screw causes the ball nut to translate in the right or left direction depending on the rotational direction of rotation of the ball screw. The ball nut is rigidly attached to a rack, which translates linearly together with the ball nut. A sector shaft has gear teeth that engages with teeth of the rack causing it to rotate in response to the translational movement of the rack, which in turn causes the wheels of the vehicle to turn, thereby steering the vehicle. In the normal operation of the vehicle, radial and tangential loads and vibrations are exerted by the wheels though the sector shaft to the rack. The forces transmitted from the sector shaft to the rack and ball nut cause the ball nut to tilt or rock relative to its ideal position. In conventional electric power steering gear assemblies, the solid shaft of the ball screw has a relatively high rigidity and the tilting of the ball nut relative to the rigid ball screw negatively affects the force transmission between the threads of the ball nut and those of the ball screw. This leads to suboptimal responsiveness of the wheels to the steering command and ultimately to premature failures of the electric power steering gear assembly.

One way to mitigate this problem is to use a hollow threaded ball screw (also referred to as the hollow ball screw) mounted on an inner shaft that transfers the rotational force of the steering command to the hollow threaded ball screw. The inner shaft is able to flex along its axis under radial loads exerted by the tilting ball nut. The inner shaft enables the hollow threaded ball screw to deflect axially under the radial load exerted by the ball nut, which allows the hollow threaded ball screw to maintain a more coaxial relationship with the tilting ball nut. This permits an improved force transmission between the hollow ball screw and ball nut and reduces unwanted stresses on the hollow ball screw and ball nut. A bushing is installed on the outer circumference of the ball nut between the ball nut and the housing limits the extent of permissible tilt of the ball nut relative to the housing.

FIG. 1 illustrates a portion of a gear assembly of a vehicle, according to one or more examples of the present disclosure. In particular, FIG. 1 illustrates a side cross-section view 100 of a portion of the complete gear assembly of the vehicle. Side cross section view 100 depicts a housing 118 that is substantially cylindrically shaped and extends horizontally and transversely to a driving direction of the vehicle. A ball nut and a hollow ball screw are disposed within the housing. Input shaft 116 receives a steering command from a user operating a steering wheel of the vehicle causing it to rotate in one direction or the other. The input shaft may be fixedly connected to an inner shaft 108, such that the inner shaft 108 rotates together with the input shaft 116. The inner shaft 108 may be rigidly attached at one end 110 to the hollow threaded ball screw 106 causing the hollow threaded ball screw 106 to rotate together with the inner shaft 108, based on the steering command received from driver at the input shaft 116. Threading on the outer circumferential surface of the hollow ball screw 106 interacts with corresponding threading on the inner surface of the ball nut 102. Because the ball nut is prevented from rotating relative to the housing, the rotational motion of the hollow ball screw 106 causes the ball nut 102 to translate laterally in a direction of an axis of the ball that depends on the rotational direction of the hollow ball screw 106. A rack 120 is rigidly connected to the ball nut and translates together with the hollow ball screw 106. A sector shaft 112 has gear teeth that engage with gear teeth of the rack causing the sector shaft 112 to rotate in response to translational motion of the ball nut 102 and rack 120. The rotational motion of the sector shaft is ultimately transmitted to the wheels of the vehicle causing them to turn.

The cross-section view 100 depicts a cross-section of the ball nut 102 and a cross-section of the hollow ball screw 106. Channels 114 are present between the hollow ball screw and the ball nut. Recirculating balls run through the channels 114 and assist in transmitting the rotational motion of the hollow ball screw 106 to a translational motion of the ball nut 102 to the left or right direction, depending on based the rotational direction of the input shaft 116 in response to a steering command. A rack 120 rigidly connected to an outer portion of the ball nut 102 has teeth that engage with corresponding teeth of a sector shaft 112. The translation of the ball nut 102 in the left or right direction causes the rack 120 to translate along with it, in turn causing the sector shaft 112 to rotate, which results in steering of the wheels of the vehicle in the left or right direction.

In some embodiments, the sector shaft 112 may be connected to a corresponding wheel of the vehicle via a pitman arm, drag link, steering knuckle, and wheel bearing. The interaction of the wheels of the vehicle with the road in turn exerts forces and vibrations to the sector shaft 112 and to the rack 120 of the electric power steering gear assembly. The lateral forces exerted by the sector shaft 112 to the rack 120 are largely parallel to, but at a distance from an axis of the ball nut. This asymmetric application of force to the ball nut 102 thus may tend to cause the ball nut 102 to tilt (or rock) relative to its initial position, and for the ball nut axis to deviate from the rotational axis of the hollow ball screw 106. The tilting of the ball nut 102 exerts a radial load on the hollow ball screw 106 via the recirculating balls. The tilting of the ball nut 102 may lead to an uneven loading of the recirculating balls in the channels 114 between the ball nut 102 and the hollow ball screw 106 and to a suboptimal transmission of forces between the hollow ball screw 106 and ball nut 102. Additionally, the tilting or rocking of the ball nut 102 also exerts an undesired radial load on the hollow ball screw 106.

In order to mitigate these undesired effects caused by tilting of the ball nut, the hollow ball screw 106 may be mounted at one end on the inner shaft 108. The hollow ball screw 106 defines a cavity extending along the length of the hollow ball screw 106. The inner shaft 108 has a smaller diameter than a diameter of the hollow ball screw 106 so that the inner shaft 108 fits in the cavity of the hollow ball screw 106. The inner shaft 108 may be rigidly attached to the hollow ball screw at a first end of the hollow ball screw 110 in a manner that causes the outer portion of the hollow ball screw to rotate together with the inner shaft as shown in FIG. 1. In some embodiments, the hollow ball screw 106 may be connected to the inner shaft 108 using a screw thread 122. The screw thread 122 may be used to counteract high axial forces from the hollow ball screw 106. The threads in the screw thread 122 are designed to be in slight interference so as to minimize axial endplay in the threaded connection. Additionally and/or alternatively, a dowel pin may be used in this connection. The dowel pin may be installed after the parts are threaded together. The dowel pin may ensure the screw threads do not unthread as torque is applied to the connection between the hollow ball screw 106 and the inner shaft 108.

The inner shaft 108 is able to flex axially under the load of the ball nut 102 due to external forces applied to the rack from the sector shaft 112. The nature of the inner shaft 108 enables the hollow ball screw 106 to deflect relative to the axial direction based on the loads exerted by the ball nut 102 and the recirculating balls such that the hollow ball screw 106 maintains a substantially coaxial relationship with the tilted ball nut 102. In some embodiments, the inner shaft 108 is made up of a medium carbon steel and is quench and tempered (through hardened) to achieve a hardness of ~28-34 Rockwell hardness C (HRC). Additionally and/or alternatively, the inner shaft 108 may also be made from a lower carbon steel and carburized to a much higher surface hardness.

Because of the flexible nature of the inner shaft 108, the combination of the ball nut 102 and the hollow ball screw 106 rock or tilt together within the housing 118. The tilting of the ball nut 102 relative to the housing 118 is limited by a spacing between the outer circumference of the ball nut 102 and an inner wall of the housing 118. A bushing 104 may be installed on the outer circumference of the ball nut to help protect the ball nut 102 from wear and tear caused by regular contact between the outer circumference of the ball nut 102 and the inner wall of the hosing 118. In some embodiments, the bushing may be made from steel, and have a low friction coating applied to the outside diameter.

Any statement made herein characterizing the invention is not to be considered restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. An electric powered steering assembly for a commercial vehicle, comprising:

a housing including a substantially cylindrical portion extending in an axial direction;

a hollow ball screw disposed in the housing, and defining a cavity extending in the axial direction;

a ball nut disposed in the housing circumferentially surrounding the hollow ball screw and configured to translate axially relative to the housing; and an inner shaft disposed in the cavity of the hollow ball screw and rigidly attached to the hollow ball screw at a first end, the inner shaft is configured to enable deflection of the hollow ball screw relative to the axial direction in response to external loads exerted by the ball nut.

2. The electric powered steering assembly of claim 1, wherein the inner shaft is composed of carbon steel that is quench and tempered to achieve a hardness of ~28-34 Rockwell hardness C (HRC).

3. The electric powered steering assembly of claim 1, wherein the inner shaft is composed of carbon steel that is carburized to achieve surface hardness.

4. The electric powered steering assembly of claim 1, wherein the inner shaft is coupled to the hollow ball screw using a screw thread.

5. The electric powered steering assembly of claim 4, wherein the inner shaft is coupled to the hollow ball screw using a dowel pin to ensure that the screw threads do not unthread under torque.

6. The electric powered steering assembly of claim 1, further comprising:

a first plurality of channels between the ball nut and the hollow ball screw; and a second plurality of recirculating balls disposed in the channels, wherein a circulation of the second plurality of recirculating balls in the first plurality of channels transmit forces from a rotation of the hollow ball screw to cause the axial translation of the ball nut.

7. The electric power steering assembly of claim 1, further comprising a bushing disposed on an outer circumference of the ball nut and configured to contact an interior surface of the housing when the hollow ball screw is deflected.

8. The electric power steering assembly of claim 1, further comprising:

a rack comprising a set of teeth is rigidly attached to an outer circumference of the ball nut and configured to translate with the ball nut as the ball nut axially translates with respect to the housing; and a sector shaft comprising a set of gear teeth that engage with the set of teeth of the rack and configured to rotate based on the translation of the rack.

9. The electric powered steering assembly of claim 7, wherein the bushing is made of steel.

10. The electric powered steering assembly of claim 7, wherein a low friction coating is applied to an outside surface of the bushing.

* * * * *